(No Model.)

W. G. SMITH.
AUTOMATIC LUBRICATOR.

No. 416,688. Patented Dec. 3, 1889.

WITNESSES:
H. S. Smith.
Z. F. Wilbur.

INVENTOR
William G. Smith
BY O'Brien & Co
his ATTORNEYS

UNITED STATES PATENT OFFICE.

WILLIAM G. SMITH, OF DENVER, COLORADO, ASSIGNOR OF ONE-HALF TO CHARLES R. HOTCHKISS, OF SAME PLACE.

AUTOMATIC LUBRICATOR.

SPECIFICATION forming part of Letters Patent No. 416,688, dated December 3, 1889.

Application filed March 20, 1889. Serial No. 304,042. (No model.)

*To all whom it may concern:*

Be it known that I, WILLIAM G. SMITH, a citizen of the United States of America, residing at Denver, in the county of Arapahoe and State of Colorado, have invented certain new and useful Improvements in Automatic Lubricators, of which the following is a specification, reference being had therein to the accompanying drawings, in which—

Figure 1:
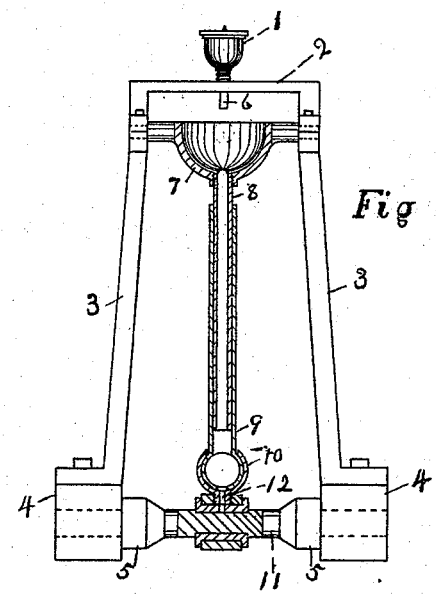
Figure 2:
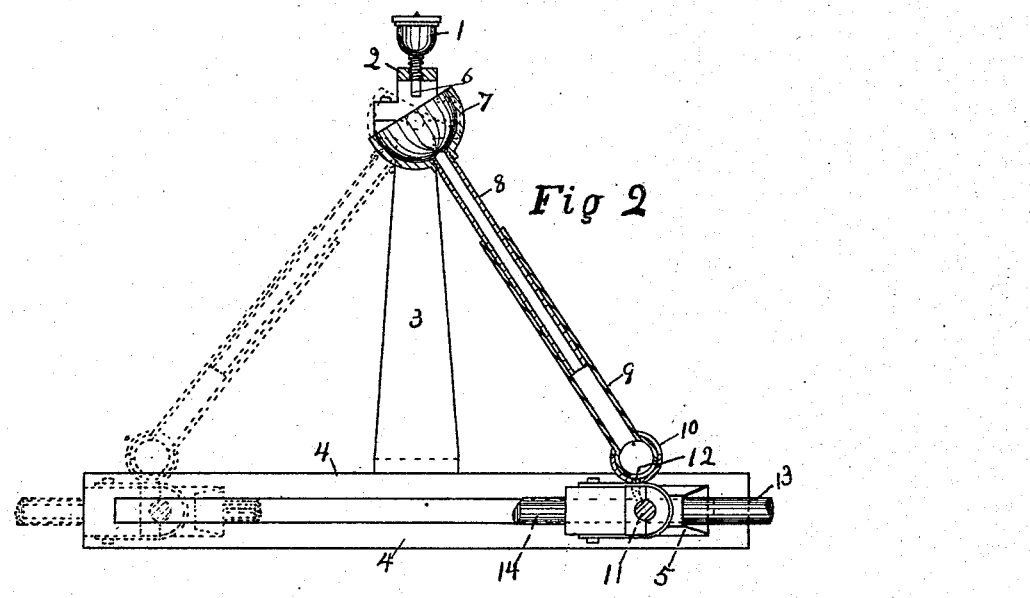

Figure 1 is an end elevation of mechanism embodying my improvement, and Fig. 2 is a side elevation of the same.

My invention relates to an automatic lubricator for reciprocating bearings, and is more particularly designed for use in conducting the required lubricant to cross-head pin of steam-engines, but may be used and will be found highly advantageous for the same purpose in connection with reciprocating or oscillating bearings of all descriptions.

For the reason above stated, my improvement is shown in the drawings in connection with the cross-head of a steam-engine and in position for conducting oil to the cross-head pin, as hereinafter set forth.

In the drawings, the reference numeral 1 is a stationary oil-cup made fast to a cross-bar 2, supported upon standards 3, secured to the guide-bars 4 of the cross-head 5 of the ordinary steam-engine. This cup is provided with a tube 6, through which the lubricant passes to the receptacle 7, to the bottom of which is attached a tube 8, which is screwed or otherwise suitably fastened into an aperture in the bottom of said receptacle 7. Tube 8 fits nicely inside another tube 9, forming a perfect telescopic connection, tube 9 being provided with a hollow globular enlargement at its lower extremity, which is received by a socket 10 of corresponding shape, forming a ball-and-socket joint. Socket 10 is made stationary upon the mechanism through which the cross-head pin 11 passes. The globular extremity of tube 9 is provided with an aperture sufficiently large to allow free access at all times to a small opening 12, which extends to the bearing to be lubricated.

Reference-numeral 13 is the piston-rod, and 14 the connecting-rod.

Receptacle 7 is pivoted to and between standards 3 in such a manner as to allow a free oscillating movement to the receptacle and to the parts attached thereto.

In the use of my improvement the lubricant passes from oil-cup 1 to receptacle 7, which is semi-spherical or of some other suitable shape, and thence into tube 8, from which it passes to tube 9, and finally to the bearing of pin 11, by virtue of the construction heretofore described. As the cross-head moves back and forth between the guide-bars 4, tubes 8 and 9, by virtue of their telescopic connection, coact in such a manner that the channel formed by them conjointly is always of the required length, no matter what the position of the cross-head pin or other oscillating or reciprocating bearing.

Having thus described my invention, what I claim, and desire to secure by Letters Patent, is—

In an automatic lubricator, the combination of the tubes 8 9, adapted to telescope relatively to each other, the former having an oil-receptacle 7 at its upper end, provided with trunnions for its pivoting, and the latter having a spherical enlargement at its lower end, and a socket 10 for containing such enlargement and forming a ball-and-socket joint therewith, substantially as set forth.

In testimony whereof I affix my signature in presence of two witnesses.

WILLIAM G. SMITH.

Witnesses:
   ISHAM R. HOWZE,
   A. J. O'BRIEN.